Patented Oct. 3, 1950

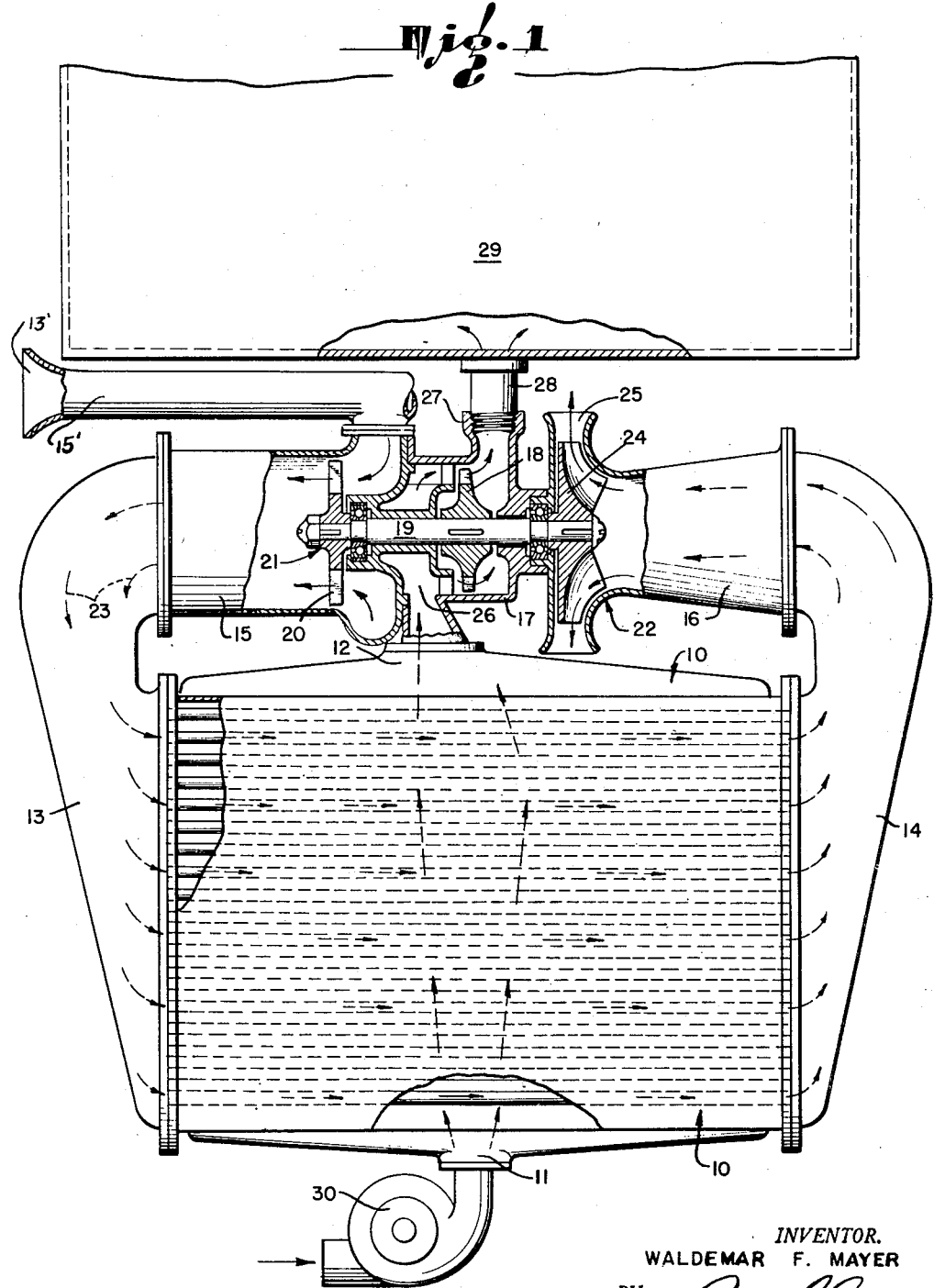

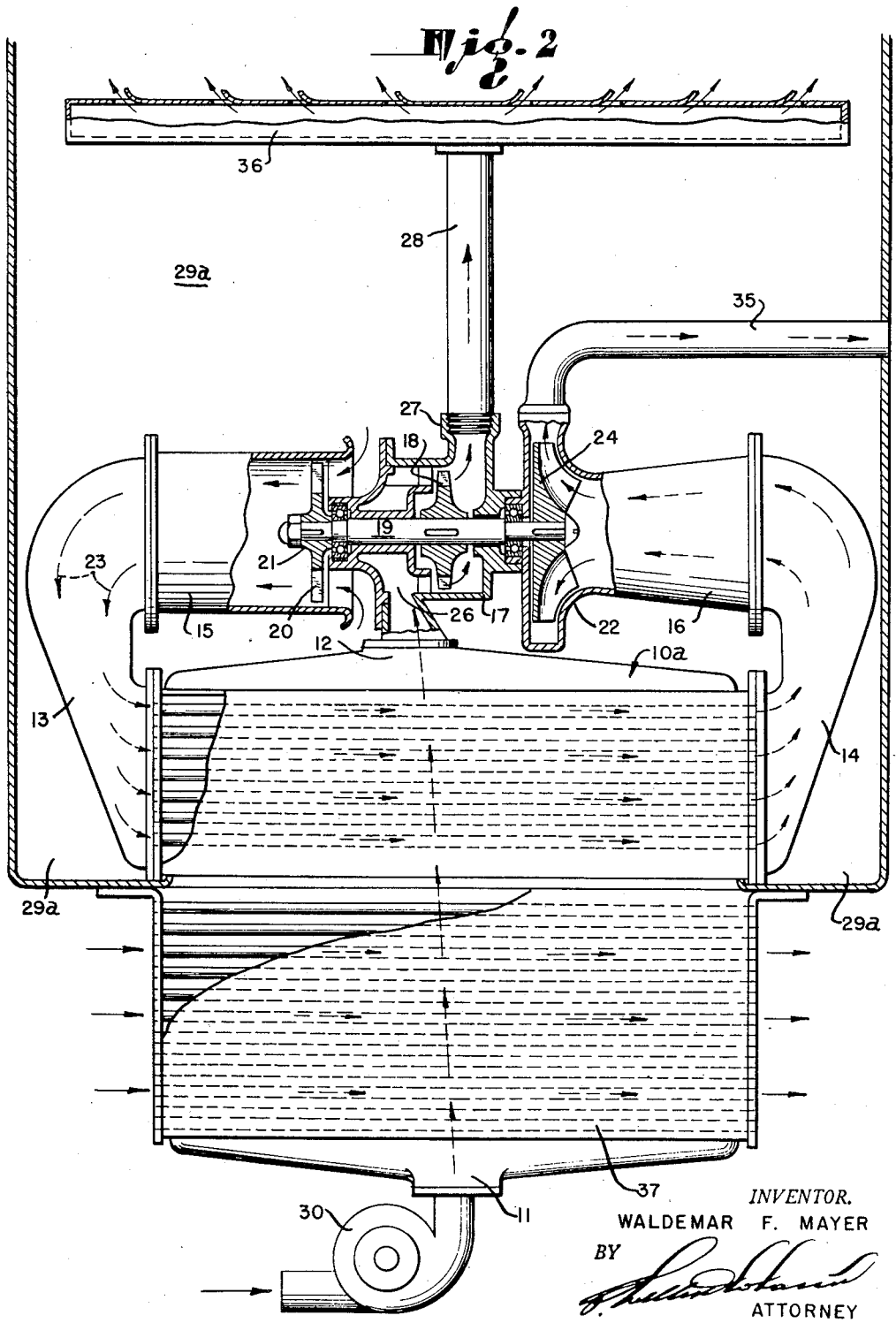

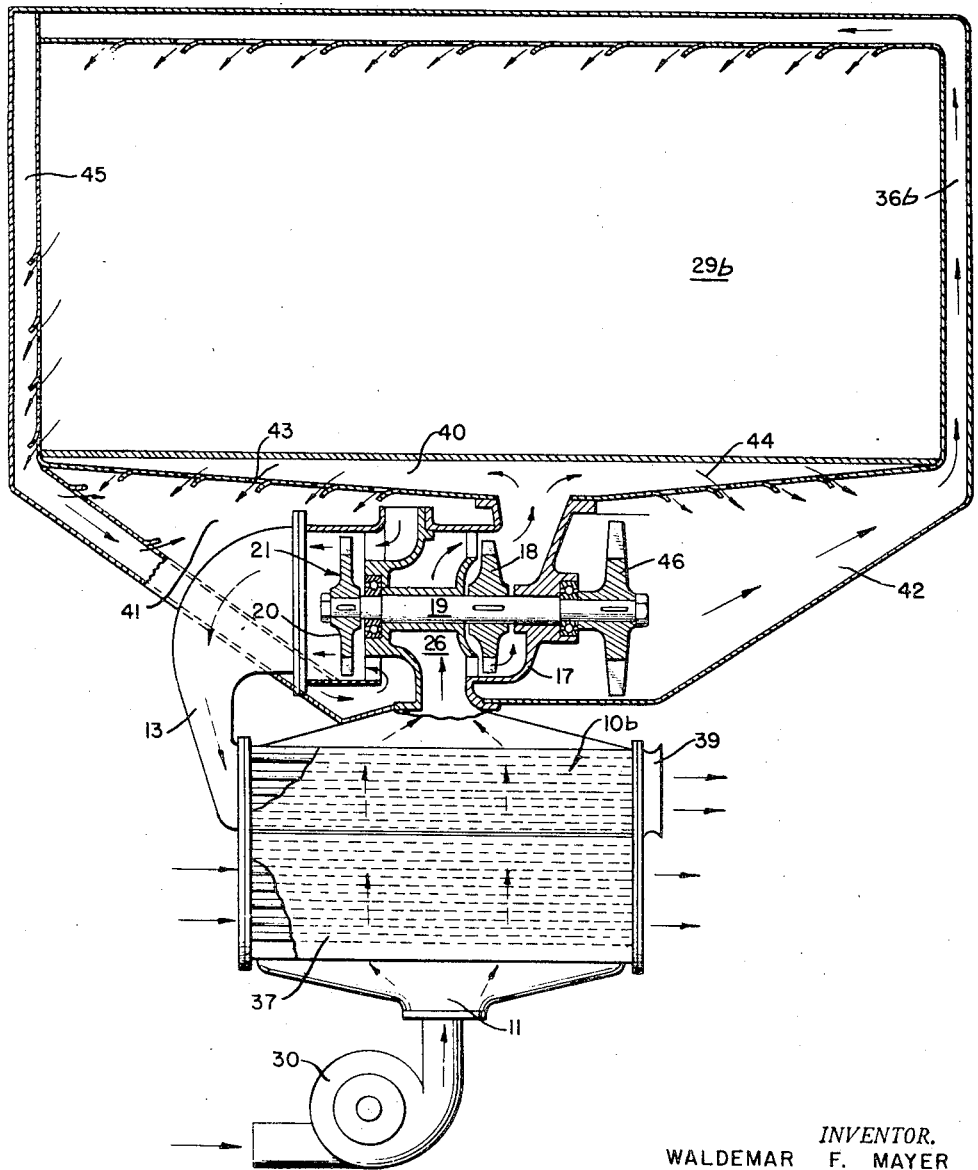

2,524,065

UNITED STATES PATENT OFFICE 2,524,065

APPARATUS AND METHOD FOR COOLING AIRCRAFT

Waldemar F. Mayer, Los Angeles, Calif., assignor to The Garrett Corporation, Los Angeles, Calif., a corporation of California Application December 3, 1946, Serial No. 713,681

31 Claims. (Cl. 62—136)

1

This invention relates to air conditioning systems and relates in particular to a simple device for regulating the temperature of air delivered under pressure into an enclosure such as an aircraft cabin. The subject matter hereof is a continuation-in-part of my copending application, Serial No. 583,054, filed March 16, 1945 for Aircraft Cooling System and Method.

It is an object of the invention to provide a simple and efficient system for cooling the pressurized air which is to be fed to a cabin, wherein an efficient cooling effect is accomplished without the use of commercial refrigerants, but instead employing air as a coolant and utilizing the cooling effect of an air driven engine, such as an air turbine.

It is an object of the invention to provide a cooling system and method wherein compressed air to be cooled and coolant air are passed in heat exchange relation, wherein power recovery engines, such as air turbines, are employed in the paths of flow of the compressed air and/or of the coolant air to produce a cooling effect, there being means whereby the power recovered from the compressed and coolant air is utilized to apply a motivating force to the coolant air.

A further object of the invention is to provide a system and method wherein at least a portion of the coolant air is taken from the pressurized cabin, passed through the coolant air turbine, then through the coolant passages of the heat exchanger and thence to the outer atmosphere or ambient atmosphere externally of the aircraft cabin. In this form of the invention power is recovered from the compressed air in the aircraft cabin, and the low temperature of the air from the aircraft cabin, after it has passed through the coolant air turbine, is employed to advantage in cooling the compressed air which is to be cooled and delivered to the cabin.

A further object of the invention is to provide a system and method of the character described in the preceding paragraph in which the power recovered from the compressed and coolant air is utilized to operate a recirculating fan, generator, oil pump, fuel pump, vacuum pump or other work absorbing means.

It is characteristic of fluids, such as the gases or compressible fluid employed in the present invention, that flowing thereof is accomplished by differential pressure. It is an object of the invention to utilize this characteristic to accomplish in a cooling device employing a compressible fluid as a coolant, an economical cooling effect by extracting work from the coolant

2 fluid by mechanical means, such as a fluid driven engine or turbine, before it contacts and/or flows over the heat exchange walls of the cooling device, thereby increasing the efficiency of the coolant by lowering its temperature before it extracts heat from the heat exchange walls of the cooling device.

It is a further object of the invention to provide a cooling device of the character set forth in the preceding paragraph wherein work extracted from the coolant fluid of compressible character is utilized to produce a suction effect upon the coolant downstream from the heat exchange walls of the cooling device, thereby further increasing the cooling effect of the coolant and by useful employment thereof, recovering the work which has been extracted from the coolant upstream from the heat exchange walls.

A further object of the invention is to provide a system and method of this character wherein coolant air is moved through the coolant passages of the cooling device by suction effect applied to the outlet of the coolant passages, thereby producing a reduction in the temperature of the coolant as the result of the reduction in pressure caused by the suction.

Further objects and advantages of the invention may be brought out in the following part of the specification, wherein specific description is for the purpose of presenting a full and complete disclosure without limiting the scope of the invention defined in the appended claims.

Referring to the drawings which are for illustrative purposes only,

Fig. 1 is a partly sectioned view, schematic in character, showing a preferred form of my invention.

Fig. 2 is a partly sectioned view, schematic in character, showing a modified form of the invention, wherein the compressed air is passed through primary and secondary coolers.

Fig. 3 is a partly sectioned view, schematic in character, showing a further modified form of the invention.

In the form of the invention disclosed in Fig. 1 a heat exchanger 10 is provided which may be of any known type of construction having passages for the air to be cooled and passages for the coolant air in heat exchange relation in order that the coolant air may absorb heat from a flow of compressed air which is to be cooled and then delivered to the cabin. Within the meaning of the term "cabin" I include any compartment into which the conditioned air is delivered. The heat exchanger has a compressed air inlet 11, a compressed air outlet 12, a coolant air inlet 13, and a coolant air outlet 14.

The coolant inlet 13 and the coolant outlet 14 respectively include duct members 15 and 16 which are axially aligned with each other and with a cooling and power recovery engine comprising a turbine 17 having a rotor 18 fixed on a shaft 19. Connected to one end of the shaft 19 is the rotor 20 of a cooling and power recovery engine disclosed as a turbine 21 situated in the duct member 15 of the coolant inlet 13.

The pumping device 22, connected to the opposite end of the shaft 19, augments the flow of the coolant air in the inlet 13 and reduces the pressure on the discharge side of the turbine 21, thereby increasing the differential pressure which would exist between the coolant air on the inlet side of the turbine and the coolant air on the discharge side of the turbine if the flow of the coolant air were not augmented by the pumping device 22. This increased pressure differential across the coolant air turbine 21 increases the cooling effect of the turbine. The pumping device 22 constitutes a power utilizing means for usefully applying a load to the turbine rotors 18 and 20 and is shown as a centrifugal suction pump or blower having an impeller 24 fixed on the shaft 19 so that it will receive rotation from the rotor 18 of the turbine 17 and the rotor 20 of the turbine 21. The impeller 24 draws air from the duct member 16 and discharges the same through an outlet 25.

The inlet 26 of the turbine 17 is connected to the compressed air outlet 12 of the heat exchanger 10, and the outlet 27 of the turbine 17 is connected through duct means 28 with the interior of the cabin, cockpit, or compartment 29. The compressed air inlet 11 is connected to a compressor 30 or other source of air under pressure which may be of any known type. In the operation of the device shown in Fig. 1, the compressed air which is to be delivered to the cabin is received in heated state, due to its compression, by the heat exchanger 10 and is initially cooled as it travels through the compressed air passages thereof to the inlet of the turbine 17. The compressed air then passes through the operative mechanism of the turbine 17 to drive the rotor 18 so that the impeller 24 of the suction pump 22 will be driven. The absorption of power from the air resulting from the driving of the turbine rotor 18, results in a further cooling of the compressed air.

The coolant air, taken into the aircraft by a ram or scoop 13' facing into the relative wind and conducted as by ducting 15' and 15, passes into the coolant inlet 13 and is carried through the operative parts of the turbine 21 which abstracts heat energy from the coolant air, this resulting in a cooling of the air and a recovery of power which is transmitted through the shaft 19 to the impeller 24 to assist in driving it. In addition to the cooling of the air by the turbine 21, the coolant air has its heat content lowered as a result of the reduction in pressure caused by the suction of the impeller 24. In the form of the invention shown in Fig. 1, coolant air outlet 25 is connected to the ambient atmosphere, as by ducting (not shown).

In the form of the invention shown in Fig. 2, the outflow air of an air conditioned or pressurized cabin is employed as the coolant air in a system of the general character shown in Fig. 1. In Fig. 2 I have shown a heat exchanger 10a of the general character of the heat exchanger 10, but of reduced size, located in a portion of a pressurized cabin 29a. With the exception that the coolant air inlet 13 receives air from the cabin, the coolant air outlet 14 is connected through the suction pump 22 with a duct 35 leading to the exterior of the cabin 29a, and the outlet 27 of the turbine 17 is connected to an air distributing duct 36 in the cabin 29a, the mechanism of Fig. 1 has been employed and the same numerals are employed in Fig. 2 to identify the previously described parts therein. A primary ambient air cooler 37 is disposed between the air compressing means 30 and the inlet 11 of the heat exchanger 10a. As shown in Fig. 2, this cooler or heat exchanger 37 may be placed outside the cabin 29a so that ambient air will pass through its coolant air passages and perform a primary cooling of the compressed air which moves through the compressed air passages of the heat exchanger 37 to the heat exchanger 10a, wherein the compressed air is further cooled by heat exchange with coolant air received from the cabin 29a.

When air is permitted to escape from a pressurized cabin into the ambient atmosphere through ordinary outflow valves or ports, the power represented by the compression of the air is wasted. In my present invention a reasonable proportion of this power of compression in the cabin air is recovered by the turbine 21 through which the air is passed on its way to the outflow duct 35.

Among the important features of the invention is the placement of the work extraction engine 21 in the path of the flow of the compressible coolant in such a position that it will act thereon before the coolant flows over the heat exchange walls—for example, the surfaces of the tubes 10a of the cooling means 10, so that the temperature of the coolant is reduced before it acts in its heat absorbing capacity, and a further feature of the invention is to transmit power recovered by the extraction of work from the coolant by the engine 21 to a suction means, shown as the suction pump or blower 22, in the path of flow of the coolant after it has passed over the heat exchange walls of the cooling means 10, to assist the flow of the coolant therethrough.

In the form of the invention shown in Fig. 3, the system for cooling compressed air which is to be delivered to the pressurized cabin is the same as that shown in Fig. 2, and consists of compressing the air in the air compressing means 30, cooling it as it travels through the primary ambient air cooler 37 and the secondary cooler 10b to the inlet 26 of the turbine 17, passing it through the operative mechanism of the turbine 17 to further cool it, and passing it through a divided duct 40 into ducts 41 and 42 as indicated by arrows 43 and 44. The ducts 42 communicates at its rightward end with the distribution duct 36b which is connected with the cabin 29b and the air outlet duct 45 of the cabin communicates with the leftward end of the duct 41. The primary ambient air cooler 37 is placed outside the cabin 29b so that ambient air may be passed through its coolant air passages and perform a primary cooling of the compressed air which moves through the compressed air passages of the cooler.

Power recovered by the turbines 17 and 21 drives a recirculation fan or blower having an impeller 46 mounted on the rightward end of the shaft 19 which carries the rotors of the turbines 17 and 21. The impeller 46 recirculates some of the air from the duct 41 through the duct 42, the duct 36b, the cabin 29b, and the duct 45 to the duct 41 which communicates with the inlet of the turbine 21 so that a volume of air substantially equal to the volume of air which enters through the turbine 17 is passed through the turbine 21, the duct 13 and the coolant air spaces of the heat exchanger 10b to the coolant air outlet 39 which communicates with ambient atmosphere. Other work absorbing means which may be utilized in place of the cabin air recirculating fan 46 are electrical generator, oil pump, fuel pump, vacuum pump, etc.

Herein the term "compressed air" is used to refer to the air which is placed under sufficient pressure to cause its movement through the system into the cabin or other space which is to be air-conditioned. This pressure or compression will vary in accordance with the pressure which is to be maintained in the air-conditioned space.

I claim as my invention:

1. Mechanism for conditioning air for the cabin of an aircraft having a compressor, comprising: a cooler having passages for the flow therethrough of compressed air from said compressor and having an inlet and an outlet for said passages, said cooler having interspaces for the flow of coolant air in heat exchange relation to said passages, means for delivering compressed air from said compressor to said inlet, a turbine in said outlet for abstracting heat energy from the compressed air passing therethrough and thereby further cooling the compressed air after the initial cooling in said passages, said cooler having for said interspaces thereof an inlet and an outlet for the coolant air axially aligned with each other and with said turbine, and means including a fan receiving driving power from said turbine for circulating coolant air through said interspaces, said fan comprising a suction fan disposed in said coolant outlet, a heat energy absorbing turbine in said coolant inlet, and a common shaft on which both of said turbines and said fan are mounted.

2. In a cooling device provided with a heat exchanger having heat transfer walls and with means for conducting a flow of compressible fluid coolant thereover, work extraction means preceding said heat exchanger and driven by said flow of coolant, and means disposed in the discharge flow of coolant from said heat exchanger for assisting the flow therethrough, said last named means being driven by said work extraction means.

3. Mechanism for conditioning air for the cabin of an aircraft having a compressor, comprising: a cooler having passages for the flow therethrough of compressed air from said compressor and having an inlet and an outlet for said passages, said cooler having interspaces for the flow of coolant air in heat exchange relation to said passages, means for delivering compressed air from said compressor to said inlet, a turbine in said outlet for abstracting heat energy from the compressed air passing therethrough and thereby further cooling the compressed air after the initial cooling in said passages, said cooler having for said interspaces a coolant inlet and a coolant outlet for the coolant air axially aligned with each other and with said turbine, said coolant inlet being connected to the cabin interior and said coolant outlet being connected to the outer atmosphere, and means including a fan receiving driving power from said turbine for circulating coolant air through said interspaces, said fan comprising a suction fan disposed in said coolant outlet, a heat energy absorbing turbine in said coolant inlet, and a common shaft on which both of said turbines and said fan are mounted.

4. In mechanism for conditioning air delivered from a compressing means to a cabin and recirculating the cabin air, the combination of: a heat exchanger having an inlet and an outlet for compressed air, and an inlet and an outlet for coolant air; means for connecting the compressed air inlet to said compressing means; a cooling and power recovery turbine connected to said compressed air outlet; air pumping means for recirculating the cabin air; and a drive connection between said turbine and said air pumping means.

5. In mechanism for conditioning air delivered from a compressing means to a cabin and recirculating the cabin air, the combination of: a heat exchanger having an inlet and an outlet for compressed air, and an inlet and an outlet for coolant air, said coolant inlet being connected to said cabin; means for connecting the compressed air inlet to said compressing means; means for connecting said compressed air outlet to said cabin; a cooling and power recovery turbine in said coolant inlet; air pumping means for recirculating the cabin air; and a drive connection between said turbine and said air pumping means.

6. In mechanism for conditioning air delivered from a compressing means to a cabin, the combination of: a heat exchanger having an inlet and an outlet for compressed air, and an inlet and an outlet for coolant air; means for connecting the compressed air inlet to said compressing means; a cooling and power recovery turbine connected to said compressed air outlet; air pumping means for producing a flow of coolant air through said heat exchanger from said coolant inlet to said coolant outlet thereof; a second cooling and power recovery turbine connected to said coolant air inlet; and a drive connection between at least one of said turbines and said air pumping means.

7. In mechanism for conditioning air delivered from a compressing means to a cabin, the combination of: a heat exchanger having an inlet and an outlet for compressed air, and an inlet and an outlet for coolant air; means for connecting the compressed air inlet to said compressing means; a cooling and power recovery turbine connected to said compressed air outlet; air pumping means connected to said coolant air outlet for moving air through the coolant passages of said heat exchanger by suction; a second cooling and power recovery turbine connected to said coolant air inlet; and a drive connection between at least one of said turbines and said air pumping means.

8. In mechanism for conditioning air delivered from a compressing means to a cabin, the combination of: a heat exchanger having an inlet and an outlet for compressed air, and an inlet and an outlet for coolant air; means for directing air from the interior of said cabin to said coolant air inlet; air discharge means for connecting said coolant air outlet to the outer atmosphere; means for connecting the compressed air inlet to said compressing means; a cooling and power recovery turbine connected to said compressed air outlet; air pumping means for producing a flow of coolant air through said heat exchanger from said coolant inlet to said coolant outlet thereof; and a drive connection between said turbine and said air pumping means.

9. In mechanism for conditioning air delivered from a compressing means to a cabin, the combination of: a heat exchanger having an inlet and an outlet for compressed air, and an inlet and an outlet for coolant air; means for directing air from the interior of said cabin to said coolant air inlet; air discharge means for connecting said coolant air outlet to the outer atmosphere; means for connecting the compressed air inlet to said compressing means; a cooling and power recovery turbine connected to said compressed air outlet; air pumping means connected to said coolant air outlet for moving air through the coolant passages of said heat exchanger by suction; and a drive connection between said turbine and said air pumping means.

10. In mechanism for conditioning air delivered from a compressing means to a cabin, the combination of: a heat exchanger having an inlet and an outlet for compressed air, and an inlet and an outlet for coolant air; means for connecting the compressed air inlet to said compressing means; a cooling and power recovery turbine connected to said compressed air outlet; air pumping means connected to said coolant air outlet for moving air through the coolant passages of said heat exchanger by suction; a second cooling and power recovery turbine connected to said coolant air inlet; means for delivering air from the interior of said cabin to said second turbine; air discharge means for connecting said coolant air outlet to the outer atmosphere; and a drive connection between at least one of said turbines and said air pumping means.

11. In mechanism for conditioning air delivered from a compressing means to a cabin, the combination of: a heat exchanger having an inlet and an outlet for compressed air, and an inlet and an outlet for coolant air; means for connecting the compressed air inlet to said compressing means; a cooling and power recovery turbine connected to said compressed air outlet; a second cooling and power recovery turbine connected to said coolant air inlet; and means for utilizing the power recovered by said turbines.

12. In mechanism for conditioning air delivered from a compressing means to a cabin, the combination of: a heat exchanger having an inlet and an outlet for compressed air, and an inlet and an outlet for coolant air; means for connecting the compressed air inlet to said compressing means; a cooling and power recovery turbine connected to said compressed air outlet; a second cooling and power recovery turbine connected to said coolant air inlet; means for delivering air from the interior of said cabin to said second turbine; air discharge means for connecting said coolant air outlet to the outer atmosphere; and means for utilizing the power recovered by said turbines.

13. In mechanism for conditioning air for the cabin of an aircraft having a compressor, comprising: a cooler having passages for the flow therethrough of compressed air from said compressor and having an inlet and an outlet for said passages, said cooler having interspaces for the flow of coolant air in heat exchange relation to said passages, means for delivering compressed air from said compressor to said inlet; a cooling and power recovery turbine in said coolant air inlet; air pumping means in said coolant outlet for moving coolant air through said heat exchanger; means for delivering air from the cabin interior to the inlet of said turbine; means for connecting the outlet of said air pumping means to the outer atmosphere; and a drive connection between said turbine and said air pumping means.

14. In cooling air which is to be delivered into a cabin by use of a heat exchanger having a compressed air passage means and coolant air passage means, air pumping means and a cooling and power recovery turbine, a method comprising the steps of: compressing air and passing it through the compressed air passage means of said heat exchanger and through said turbine to said cabin; and utilizing power recovered by said turbine to recirculate air through a closed circuit which includes said cabin.

15. In cooling air which is to be delivered into a cabin by use of a heat exchanger having a compressed air passage means and coolant air passage means, air pumping means and first and second cooling and power recovery turbines, a method comprising the steps of: compressing air and passing it through the compressed air passage means of said heat exchanger and through said first turbine to said cabin; establishing a path of flow of coolant air through said second turbine and said coolant air passage means of said heat exchanger; and utilizing power recovered by at least one of said turbines to pump coolant air through said coolant air passage means.

16. In cooling air which is to be delivered into a cabin by use of a heat exchanger having a compressed air passage means and coolant air passage means, air pumping means and first and second cooling and power recovery turbines, a method comprising the steps of: compressing air and passing it through the compressed air passage means of said heat exchanger and through said first turbine to said cabin; establishing a path of flow of coolant air through said second turbine and said coolant air passage means of said heat exchanger; and utilizing power recovered by at least one of said turbines to pump coolant air through said coolant air passage means by suction effect applied to the outlet of said coolant air passage means.

17. In cooling air which is to be delivered into a cabin by use of a heat exchanger having a compressed air passage means and coolant air passage means, air pumping means and first and second cooling and power recovery turbines, a method comprising the steps of: compressing air and passing it through the compressed air passage means of said heat exchanger and through said first turbine to said cabin; establishing a path of flow of coolant air through said second turbine and said coolant air passage means of said heat exchanger; utilizing the power recovered by said turbines; and applying suction effect to the outlet of said coolant air passage means of said heat exchanger to move coolant air therethrough.

18. In cooling air which is to be delivered into a cabin by use of a heat exchanger having a compressed air passage means and coolant air passage means, air pumping means and first and second cooling and power recovery turbines, a method comprising the steps of: compressing air and passing it through the compressed air passage means of said heat exchanger and through said first turbine to said cabin; establishing a path of flow of coolant air from the cabin interior through said second turbine and said coolant air passage means of said heat exchanger to the outer atmosphere; and utilizing power recovered by at least one of said turbines to pump coolant air through said coolant air passage means.

19. In an aircraft cooling means provided with a heat exchanger: means defining independent airflow paths connected to said heat exchanger; a source of coolant air connected to one of said paths; means for causing said coolant air to flow through said last-named path; and means for pre-cooling said coolant air comprising work extraction means preceding said heat exchanger and driven by said coolant airflow.

20. In an aircraft cooling means provided with a heat exchanger: means defining independent airflow paths connected to said heat exchanger; a source of coolant air under ram pressure connected to one of said paths; and means for pre-cooling said coolant air comprising work extraction means preceding said heat exchanger and driven by said coolant airflow.

21. In an aircraft cooling means provided with a heat exchanger: means defining independent airflow paths connected to said heat exchanger; a source of compressed coolant air connected to one of said paths; and means for pre-cooling said coolant air comprising work extraction means preceding said heat exchanger and driven by said coolant airflow.

22. In mechanism for conditioning compressed air delivered to a cabin, the combination of: a heat exchanger having an inlet and an outlet for compressed air, and an inlet and an outlet for coolant air; means for connecting the compressed air inlet with a source of compressed air; means for connecting the coolant air inlet with a source of air at atmospheric pressure; a cooling and power recovery turbine connected to said compressed air outlet; air pumping means driven by said turbine for producing a pressure differential between the coolant inlet and outlet; and a second cooling and power recovery turbine connected to said coolant inlet having a driving connection with said first turbine.

23. In mechanism for conditioning compressed air delivered to a cabin, the combination of: a heat exchanger having an inlet and an outlet for compressed air, and an inlet and an outlet for coolant air; means for connecting the compressed air inlet with a source of compressed air; means for connecting the coolant air inlet with a source of air under ram pressure; a cooling and power recovery turbine connected to said coolant inlet; air pumping means driven by said turbine for augmenting flow of coolant air between the coolant inlet and outlet; and work extraction means connected to said compressed air outlet and driven by the compressed air for further cooling it prior to delivery to the cabin.

24. In mechanism for conditioning compressed air delivered to a cabin, the combination of: a heat exchanger having an inlet and an outlet for compressed air, and an inlet and an outlet for coolant air; means for connecting the compressed air inlet with a source of compressed air; air compressing means connected with the coolant air inlet; a cooling and power recovery turbine connected between said compressing means and coolant inlet; air pumping means driven by said turbine for augmenting flow of coolant air between the coolant inlet and outlet; and work extraction means connected to said compressed air outlet and driven by the compressed air for further cooling it prior to delivery to the cabin.

25. A system for cooling the air within an aircraft compartment, comprising: a ram inlet; means for converting energy of said ram air into mechanical energy; heat exchanging means receiving the air cooled by said last named means; a compressor for increasing the flow of air into said inlet; means for transmitting said mechanical energy to said compressor to drive the same; and duct means leading from the atmosphere through said heat exchanging means to said compartment.

26. The method of reducing the temperature of air supplied to a compartment of an aircraft comprising the steps of: extracting energy from ram air by substantially adiabatically expanding said air to lower the temperature thereof; passing said expanded air through a heat exchanging means in heat receiving relationship with ventilation air prior to its introduction into said compartment; and utilizing the energy extracted from said ram air to increase the expansion of said ram air.

27. The method of reducing the temperature of air supplied to a compartment of an aircraft comprising the steps of: extracting energy from ram air by substantially adiabatically expanding said air by passing the same through an expansion turbine to lower the temperature of said air; passing said expanded air through a heat exchanging means in heat receiving relationship with ventilation air to be supplied to said compartment; introducing said cooled ventilation air to said compartment; and driving an air moving means by the energy extracted from said air to increase the rate of flow of air through said turbine.

28. A system for cooling the air for delivery to a compartment, comprising: a coolant air duct; a turbine arranged in said coolant air duct; a heat exchanger through which the air cooled by expansion through the turbine is directed; compressor means adapted to be driven by said turbine for increasing the flow of air through said turbine; means for leading a flow of air through said heat exchanger to be cooled thereby; and means for conducting the air cooled by passage through said heat exchanger to said compartment.

29. A system for cooling the air for delivery to a compartment, comprising: a source of compressed air; turbine means for expanding said air to reduce the temperature thereof; means for conducting air to said compartment; heat exchanging means mounted in said conducting means through which air cooled by said expansion passes to thereby reduce the temperature of the air conducted to said compartment; and means driven by said turbine means for increasing the rate of flow of air through said turbine means.

30. A system for cooling the air within an aircraft compartment, comprising: a ram inlet; a duct for receiving ram air from said inlet; a turbine arranged in said duct; a heat exchanger carried by said duct through which the air cooled by expansion through the turbine is directed; compressor means mounted in said duct downstream from said heat exchanger for augmenting the flow of air through said duct; means for leading air through said heat exchanger in heat exchanging relationship with the air cooled by expansion through said turbine; and conduit means for leading the cooled air from said heat exchanger to said compartment.

31. A system for cooling the air within an aircraft compartment, comprising: a ram inlet; duct means leading from said inlet to the atmosphere; a turbine arranged in said duct means; compressor means mounted in said duct means adapted to be driven by said turbine to increase the flow of air therethrough; a heat exchanger disposed in said duct means intermediate said turbine and compressor through which the air cooled by expansion through the turbine is directed; means for leading air through said heat exchanger; and conduit means leading from said heat exchanger to said compartment.

WALDEMAR F. MAYER.

REFERENCES CITED

The following references are of record in the file of this patent:

UNITED STATES PATENTS

| Number | Name | Date |
|---|---|---|
| 1,824,037 | Dean | Sept. 22, 1931 |
| 2,391,838 | Kleinhans | Dec. 25, 1945 |
| 2,453,923 | Mayo | Nov. 16, 1948 |